(12) United States Patent
Dewan et al.

(10) Patent No.: US 11,720,363 B2
(45) Date of Patent: Aug. 8, 2023

(54) APPARATUS AND METHOD FOR SECURE, EFFICIENT MICROCODE PATCHING

(71) Applicant: Intel Corporation, Santa Clara, CA (US)

(72) Inventors: Prashant Dewan, Portland, OR (US); Arun Hodigere, Bangalore (IN); Karunakara Karunakara Kotary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/485,400

(22) Filed: Sep. 25, 2021

(65) Prior Publication Data
US 2023/0097693 A1  Mar. 30, 2023

(30) Foreign Application Priority Data
Dec. 18, 2020  (IN) .............................. 202041055140

(51) Int. Cl.
*G06F 9/30* (2018.01)
*G06F 12/02* (2006.01)
*G06F 9/26* (2006.01)

(52) U.S. Cl.
CPC .......... *G06F 9/30145* (2013.01); *G06F 9/268* (2013.01); *G06F 9/3017* (2013.01); *G06F 12/0246* (2013.01)

(58) Field of Classification Search
CPC .... G06F 9/30145; G06F 9/268; G06F 9/3017; G06F 12/0246
See application file for complete search history.

(56) References Cited

U.S. PATENT DOCUMENTS

2007/0088939 A1\* 4/2007 Baumberger ............. G06F 9/24
712/248
2019/0004788 A1 1/2019 Juliato et al.

FOREIGN PATENT DOCUMENTS

EP  3674890 A1  7/2020

OTHER PUBLICATIONS

European Search Report and Search Opinion, EP App. No. 21197505.7, dated Feb. 17, 2022, 8 pages.

\* cited by examiner

*Primary Examiner* — Zachary K Huson
(74) *Attorney, Agent, or Firm* — Nicholson De Vos Webster & Elliott LLP

(57) ABSTRACT

An apparatus and method for efficient microcode patching. For example, one embodiment of an apparatus comprises: a package comprising one or more integrated circuit dies, the one or more integrated circuit dies comprising: a plurality of cores; and a security controller coupled to the plurality of cores, a first core of the plurality of cores comprising: a decoder to decode a microcode patching instruction, the microcode patching instruction comprising an operand to be used to identify an address; and execution circuitry to execute the microcode patching instruction, wherein responsive to the microcode patching instruction, the execution circuitry and/or security controller are to: retrieve a microcode patch from a location in memory based on the address, validate the microcode patch, apply the microcode patch to update or replace microcode associated with the one or more integrated circuit dies, and transmit the microcode patch to a persistent storage device; wherein the microcode patch is to be subsequently retrieved from the persistent storage device by one or more external security controllers of one or more external integrated circuit dies, the one or more external security controllers to cause the microcode patch to be applied to update or replace microcode associated with the one or more external integrated circuit dies.

27 Claims, 16 Drawing Sheets

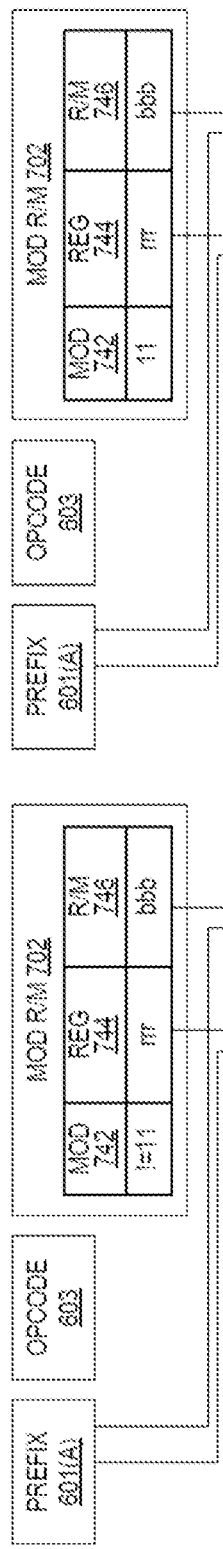
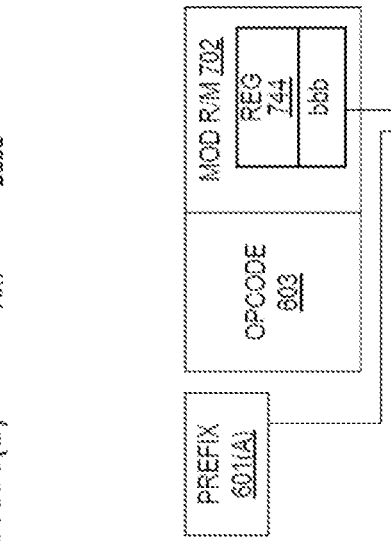
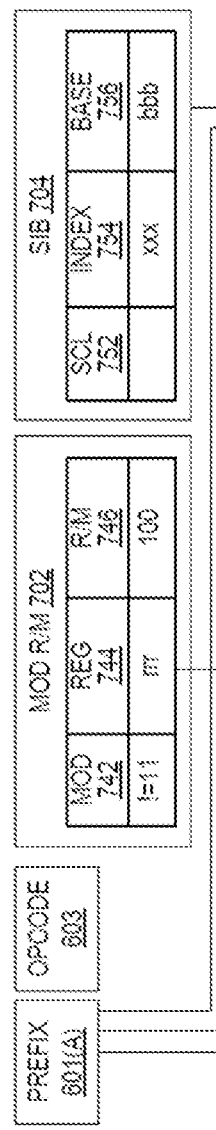

APPARATUS AND METHOD FOR SECURE, EFFICIENT MICROCODE PATCHING

BACKGROUND

Field of the Invention

The embodiments of the invention relate generally to the field of computer processors. More particularly, the embodiments relate to an apparatus and method for secure and efficient microcode patching.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which:

FIG. 8 illustrates one embodiment of an instruction prefix;

FIGS. 9A-D illustrate embodiments of how the R, X, and B fields of the prefix are used;

DETAILED DESCRIPTION

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 1:
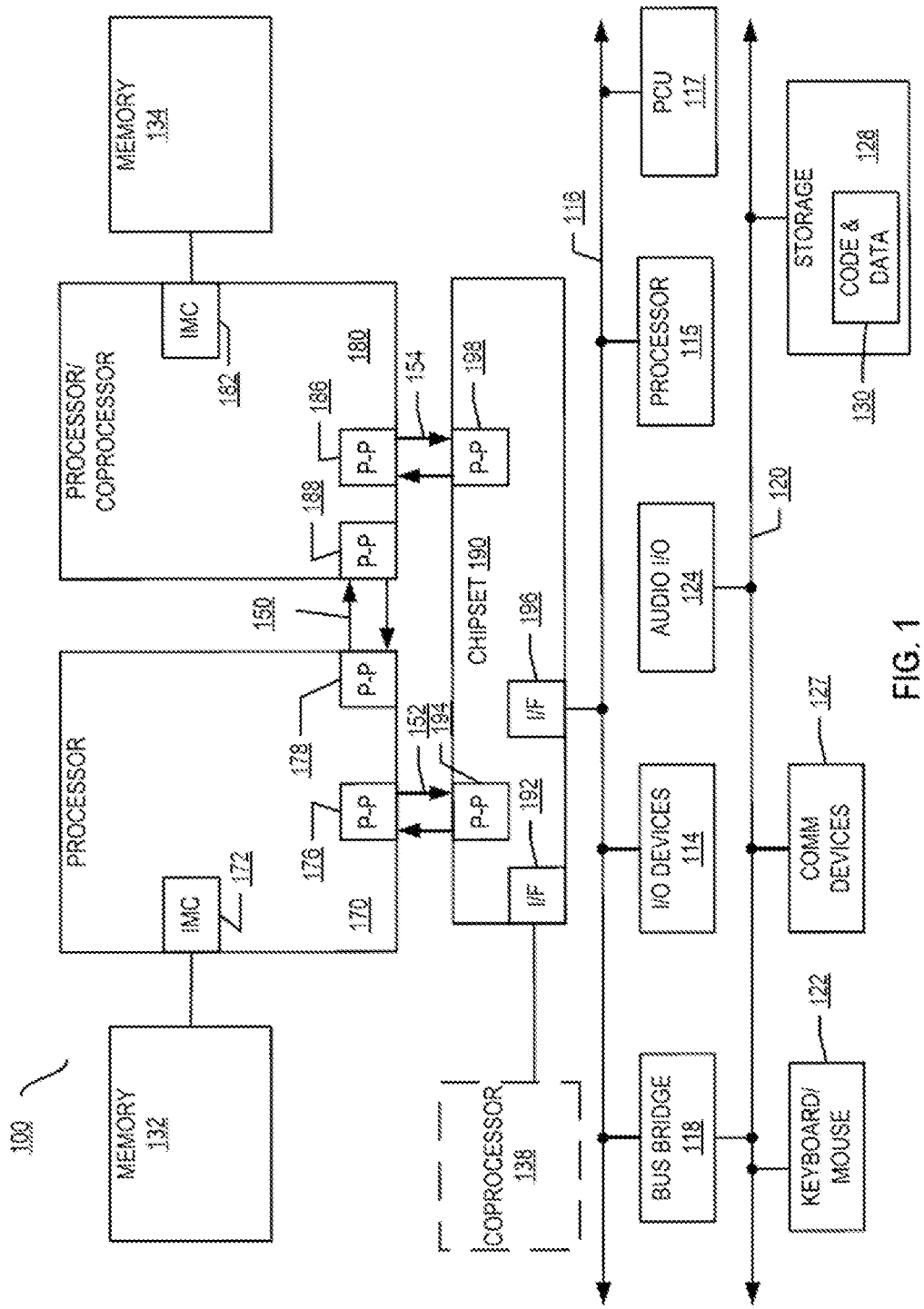
FIG. 1 illustrates an example computer system architecture.

FIG. 1 illustrates embodiments of an exemplary system. Multiprocessor system 100 is a point-to-point interconnect system and includes a plurality of processors including a first processor 170 and a second processor 180 coupled via a point-to-point interconnect 150. In some embodiments, the first processor 170 and the second processor 180 are homogeneous. In some embodiments, first processor 170 and the second processor 180 are heterogenous.

Processors 170 and 180 are shown including integrated memory controller (IMC) units circuitry 172 and 182, respectively. Processor 170 also includes as part of its interconnect controller units point-to-point (P-P) interfaces 176 and 178; similarly, second processor 180 includes P-P interfaces 186 and 188. Processors 170, 180 may exchange information via the point-to-point (P-P) interconnect 150 using P-P interface circuits 178, 188. IMCs 172 and 182 couple the processors 170, 180 to respective memories, namely a memory 132 and a memory 134, which may be portions of main memory locally attached to the respective processors.

Processors 170, 180 may each exchange information with a chipset 190 via individual P-P interconnects 152, 154 using point to point interface circuits 176, 194, 186, 198. Chipset 190 may optionally exchange information with a coprocessor 138 via a high-performance interface 192. In some embodiments, the coprocessor 138 is a special-purpose processor, such as, for example, a high-throughput MIC processor, a network or communication processor, compression engine, graphics processor, GPGPU, embedded processor, or the like.

A shared cache (not shown) may be included in either processor 170, 180 or outside of both processors, yet connected with the processors via P-P interconnect, such that either or both processors' local cache information may be stored in the shared cache if a processor is placed into a low power mode.

Chipset 190 may be coupled to a first interconnect 116 via an interface 196. In some embodiments, first interconnect 116 may be a Peripheral Component Interconnect (PCI) interconnect, or an interconnect such as a PCI Express interconnect or another I/O interconnect. In some embodiments, one of the interconnects couples to a power control unit (PCU) 117, which may include circuitry, software, and/or firmware to perform power management operations with regard to the processors 170, 180 and/or co-processor 138. PCU 117 provides control information to a voltage regulator to cause the voltage regulator to generate the appropriate regulated voltage. PCU 117 also provides control information to control the operating voltage generated. In various embodiments, PCU 117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 117 is illustrated as being present as logic separate from the processor 170 and/or processor 180. In other cases, PCU 117 may execute on a given one or more of cores (not shown) of processor 170 or 180. In some cases, PCU 117 may be implemented as a microcontroller (dedicated or general-purpose) or other control logic configured to execute its own dedicated power management code, sometimes referred to as P-code. In yet other embodiments, power management operations to be performed by PCU 117 may be implemented externally to a processor, such as by way of a separate power management integrated circuit (PMIC) or another component external to the processor. In yet other embodiments, power management operations to be performed by PCU 117 may be implemented within BIOS or other system software.

Various I/O devices 114 may be coupled to first interconnect 116, along with an interconnect (bus) bridge 118 which couples first interconnect 116 to a second interconnect 120. In some embodiments, one or more additional processor(s) 115, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 116. In some embodiments, second interconnect 120 may be a low pin count (LPC) interconnect. Various devices may be coupled to second interconnect 120 including, for example, a keyboard and/or mouse 122, communication devices 127 and a storage unit circuitry 128. Storage unit circuitry 128 may be a disk drive or other mass storage device which may include instructions/code and data 130, in some embodiments. Further, an audio I/O 124 may be coupled to second interconnect 120. Note that other architectures than the point-to-point architecture described above are possible. For example, instead of the point-to-point architecture, a system such as multiprocessor system 100 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 2:
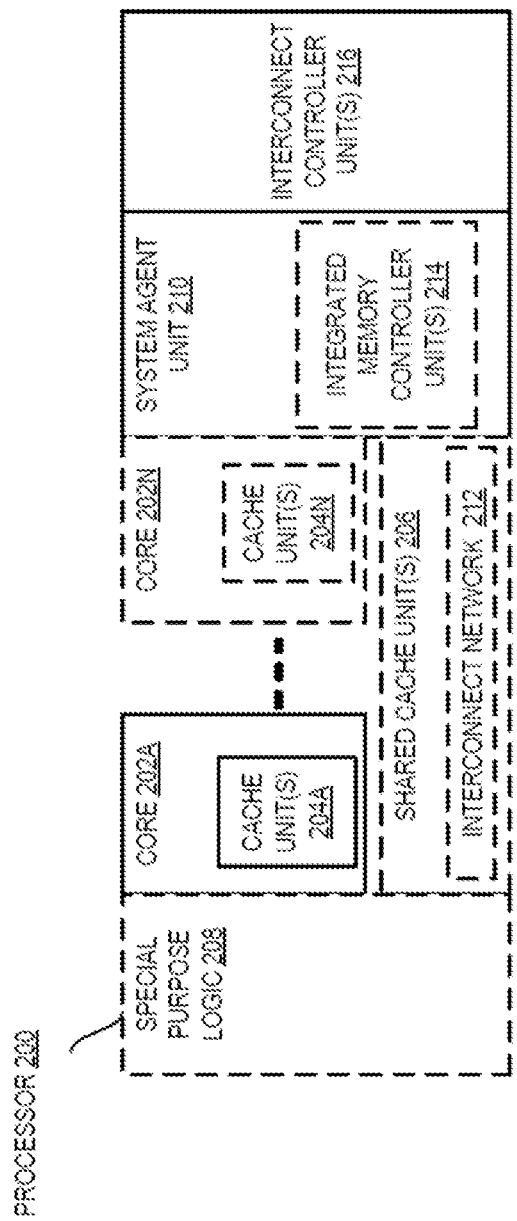
FIG. 2 illustrates a processor comprising a plurality of cores.

FIG. 2 illustrates a block diagram of embodiments of a processor 200 that may have more than one core, may have an integrated memory controller, and may have integrated graphics. The solid lined boxes illustrate a processor 200 with a single core 202A, a system agent 210, a set of one or more interconnect controller units circuitry 216, while the optional addition of the dashed lined boxes illustrates an alternative processor 200 with multiple cores 202(A)-(N), a set of one or more integrated memory controller unit(s) circuitry 214 in the system agent unit circuitry 210, and special purpose logic 208, as well as a set of one or more interconnect controller units circuitry 216. Note that the processor 200 may be one of the processors 170 or 180, or co-processor 138 or 115 of FIG. 1.

Thus, different implementations of the processor 200 may include: 1) a CPU with the special purpose logic 208 being integrated graphics and/or scientific (throughput) logic (which may include one or more cores, not shown), and the cores 202(A)-(N) being one or more general purpose cores (e.g., general purpose in-order cores, general purpose out-of-order cores, or a combination of the two); 2) a coprocessor with the cores 202(A)-(N) being a large number of special purpose cores intended primarily for graphics and/or scientific (throughput); and 3) a coprocessor with the cores 202(A)-(N) being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

A memory hierarchy includes one or more levels of cache unit(s) circuitry 204(A)-(N) within the cores 202(A)-(N), a set of one or more shared cache units circuitry 206, and external memory (not shown) coupled to the set of integrated memory controller units circuitry 214. The set of one or more shared cache units circuitry 206 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 212 interconnects the special purpose logic 208 (e.g., integrated graphics logic), the set of shared cache units circuitry 206, and the system agent unit circuitry 210, alternative embodiments use any number of well-known techniques for interconnecting such units. In some embodiments, coherency is maintained between one or more of the shared cache units circuitry 206 and cores 202(A)-(N).

In some embodiments, one or more of the cores 202(A)-(N) are capable of multi-threading. The system agent unit circuitry 210 includes those components coordinating and operating cores 202(A)-(N). The system agent unit circuitry 210 may include, for example, power control unit (PCU) circuitry and/or display unit circuitry (not shown). The PCU may be or may include logic and components needed for regulating the power state of the cores 202(A)-(N) and/or the special purpose logic 208 (e.g., integrated graphics logic). The display unit circuitry is for driving one or more externally connected displays.

The cores 202(A)-(N) may be homogenous or heterogeneous in terms of architecture instruction set; that is, two or more of the cores 202(A)-(N) may be capable of executing the same instruction set, while other cores may be capable of executing only a subset of that instruction set or a different instruction set.

Exemplary Core Architectures
In-Order and Out-of-Order Core Block Diagram

Figure 3A:
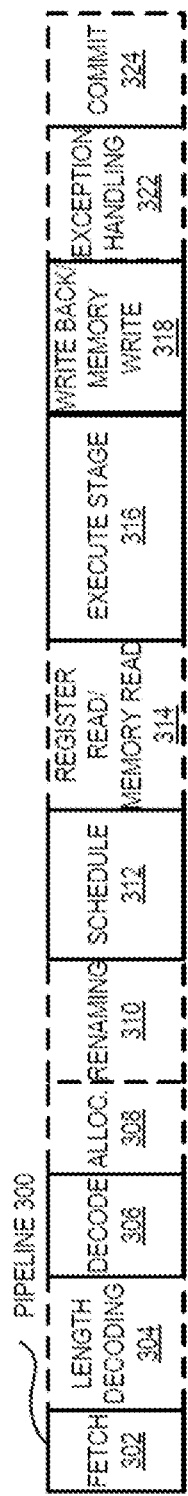
FIG. 3A illustrates a plurality of stages of a processing pipeline.
Figure 3B:
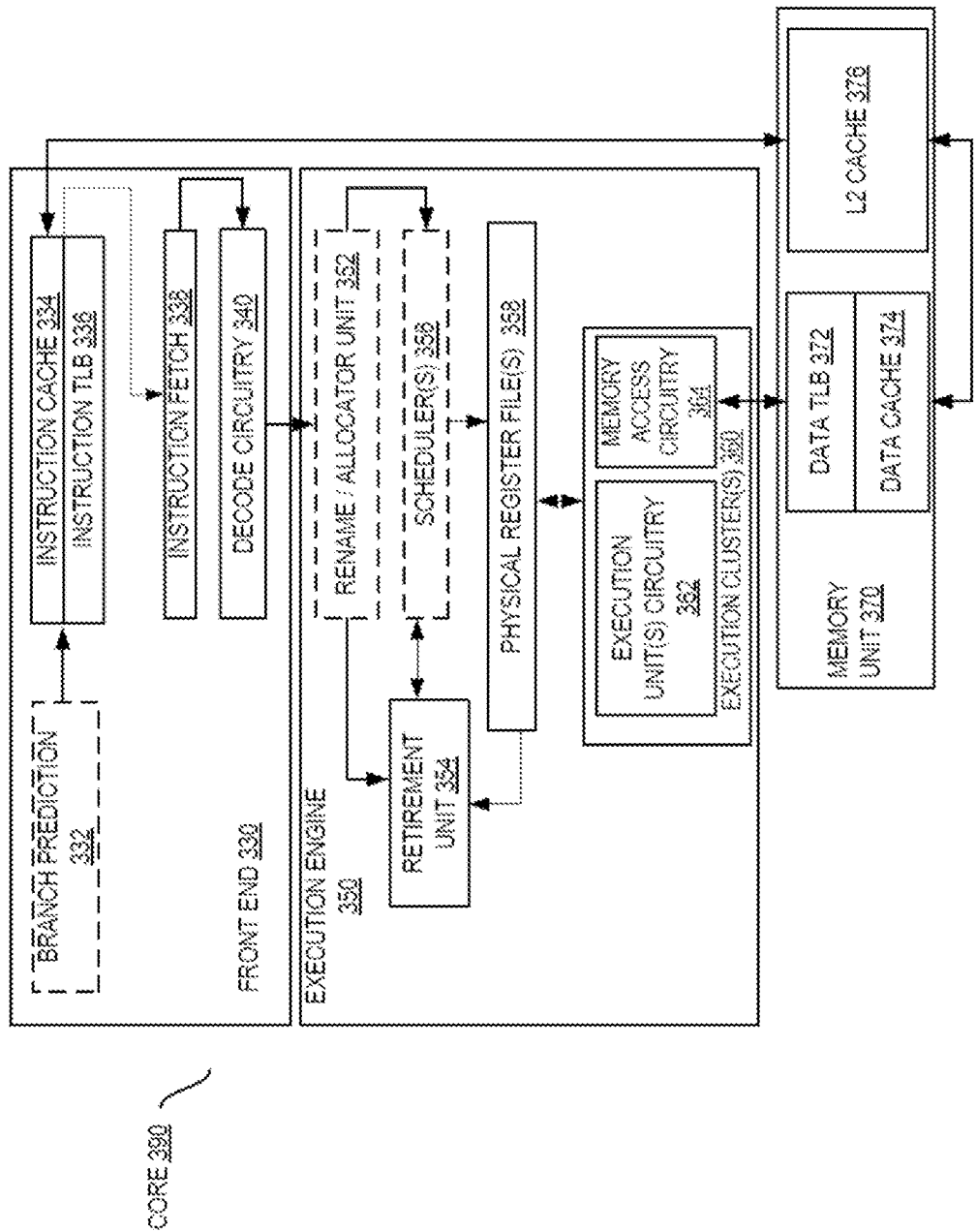
FIG. 3B illustrates details of one embodiment of a core.

FIG. 3(A) is a block diagram illustrating both an exemplary in-order pipeline and an exemplary register renaming, out-of-order issue/execution pipeline according to embodiments of the invention. FIG. 3(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 3(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3(A), a processor pipeline 300 includes a fetch stage 302, an optional length decode stage 304, a decode stage 306, an optional allocation stage 308, an optional renaming stage 310, a scheduling (also known as a dispatch or issue) stage 312, an optional register read/memory read stage 314, an execute stage 316, a write back/memory write stage 318, an optional exception handling stage 322, and an optional commit stage 324. One or more operations can be performed in each of these processor pipeline stages. For example, during the fetch stage 302, one or more instructions are fetched from instruction memory, during the decode stage 306, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 306 and the register read/memory read stage 314 may be combined into one pipeline stage. In one embodiment, during the execute stage 316, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 300 as follows: 1) the instruction fetch 338 performs the fetch and length decoding stages 302 and 304; 2) the decode unit circuitry 340 performs the decode stage 306; 3) the rename/allocator unit circuitry 352 performs the allocation stage 308 and renaming stage 310; 4) the scheduler unit(s) circuitry 356 performs the schedule stage 312; 5) the physical register file(s) unit(s) circuitry 358 and the memory unit circuitry 370 perform the register read/memory read stage 314; the execution cluster 360 perform the execute stage 316; 6) the memory unit circuitry 370 and the physical register file(s) unit(s) circuitry 358 perform the write back/memory write stage 318; 7) various units (unit circuitry) may be involved in the exception handling stage 322; and 8) the retirement unit circuitry 354 and the physical register file(s) unit(s) circuitry 358 perform the commit stage 324.

FIG. 3(B) shows processor core 390 including front-end unit circuitry 330 coupled to an execution engine unit circuitry 350, and both are coupled to a memory unit circuitry 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit circuitry 330 may include branch prediction unit circuitry 332 coupled to an instruction cache unit circuitry 334, which is coupled to an instruction translation lookaside buffer (TLB) 336, which is coupled to instruction fetch unit circuitry 338, which is coupled to decode unit circuitry 340. In one embodiment, the instruction cache unit circuitry 334 is included in the memory unit circuitry 370 rather than the front-end unit circuitry 330. The decode unit circuitry 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 340 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM (not shown) or other medium that stores microcode for certain macroinstructions (e.g., in decode unit circuitry 340 or otherwise within the front end unit circuitry 330). In one embodiment, the decode unit circuitry 340 includes a micro-operation (micro-op) or operation cache (not shown) to hold/cache decoded operations, micro-tags, or micro-operations generated during the decode or other stages of the processor pipeline 300. The decode unit circuitry 340 may be coupled to rename/allocator unit circuitry 352 in the execution engine unit circuitry 350.

The execution engine circuitry 350 includes the rename/allocator unit circuitry 352 coupled to a retirement unit circuitry 354 and a set of one or more scheduler(s) circuitry 356. The scheduler(s) circuitry 356 represents any number of different schedulers, including reservations stations, central instruction window, etc. In some embodiments, the scheduler(s) circuitry 356 can include arithmetic logic unit (ALU) scheduler/scheduling circuitry, ALU queues, arithmetic generation unit (AGU) scheduler/scheduling circuitry, AGU queues, etc. The scheduler(s) circuitry 356 is coupled to the physical register file(s) circuitry 358. Each of the physical register file(s) circuitry 358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 358 includes vector registers unit circuitry, writemask registers unit circuitry, and scalar register unit circuitry. These register units may provide architectural vector registers, vector mask registers, general-purpose registers, etc. The physical register file(s) unit(s) circuitry 358 is overlapped by the retirement unit circuitry 354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 354 and the physical register file(s) circuitry 358 are coupled to the execution cluster(s) 360. The execution cluster(s) 360 includes a set of one or more execution units circuitry 362 and a set of one or more memory access circuitry 364. The execution units circuitry 362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 356, physical register file(s) unit(s) circuitry 358, and execution cluster(s) 360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 364). It should also be understood that where separate pipelines are used, one or more of these pipelines may be out-of-order issue/execution and the rest in-order.

In some embodiments, the execution engine unit circuitry 350 may perform load store unit (LSU) address/data pipelining to an Advanced Microcontroller Bus (AHB) interface (not shown), and address phase and writeback, data phase load, store, and branches.

The set of memory access circuitry 364 is coupled to the memory unit circuitry 370, which includes data TLB unit circuitry 372 coupled to a data cache circuitry 374 coupled to a level 2 (L2) cache circuitry 376. In one exemplary embodiment, the memory access units circuitry 364 may include a load unit circuitry, a store address unit circuit, and a store data unit circuitry, each of which is coupled to the data TLB circuitry 372 in the memory unit circuitry 370. The instruction cache circuitry 334 is further coupled to a level 2 (L2) cache unit circuitry 376 in the memory unit circuitry 370. In one embodiment, the instruction cache 334 and the data cache 374 are combined into a single instruction and data cache (not shown) in L2 cache unit circuitry 376, a level 3 (L3) cache unit circuitry (not shown), and/or main memory. The L2 cache unit circuitry 376 is coupled to one or more other levels of cache and eventually to a main memory.

The core 390 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 390 includes logic to support a packed data instruction set extension (e.g., AVX1, AVX2), thereby allowing the operations used by many multimedia applications to be performed using packed data.

Exemplary Execution Unit(s) Circuitry

Figure 4:
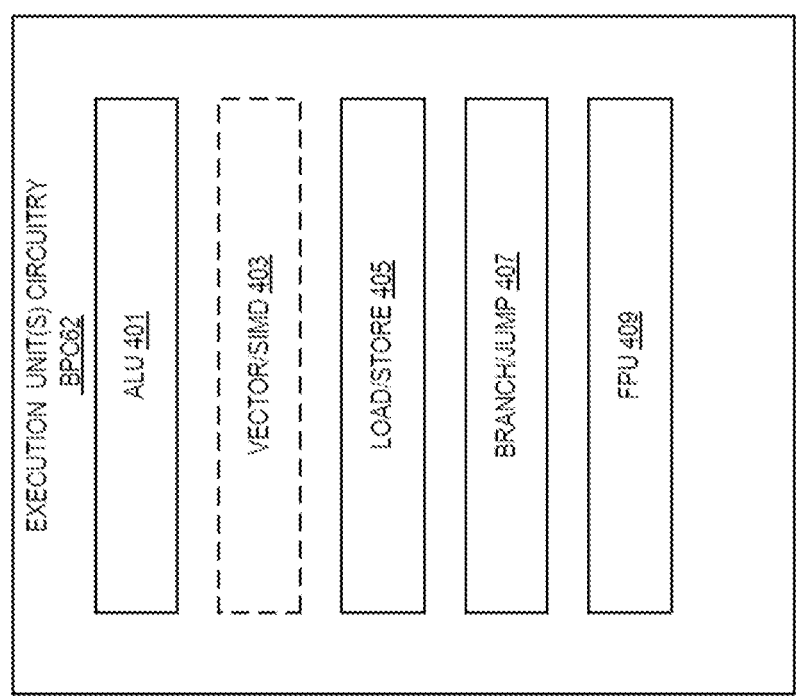
FIG. 4 illustrates execution circuitry in accordance with one embodiment.

FIG. 4 illustrates embodiments of execution unit(s) circuitry, such as execution unit(s) circuitry 362 of FIG. 3(B). As illustrated, execution unit(s) circuity 362 may include one or more ALU circuits 401, vector/SIMD unit circuits 403, load/store unit circuits 405, and/or branch/jump unit circuits 407. ALU circuits 401 perform integer arithmetic and/or Boolean operations. Vector/SIMD unit circuits 403 perform vector/SIMD operations on packed data (such as SIMD/vector registers). Load/store unit circuits 405 execute load and store instructions to load data from memory into registers or store from registers to memory. Load/store unit circuits 405 may also generate addresses. Branch/jump unit circuits 407 cause a branch or jump to a memory address depending on the instruction. Floating-point unit (FPU) circuits 409 perform floating-point arithmetic. The width of the execution unit(s) circuitry 362 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 5:
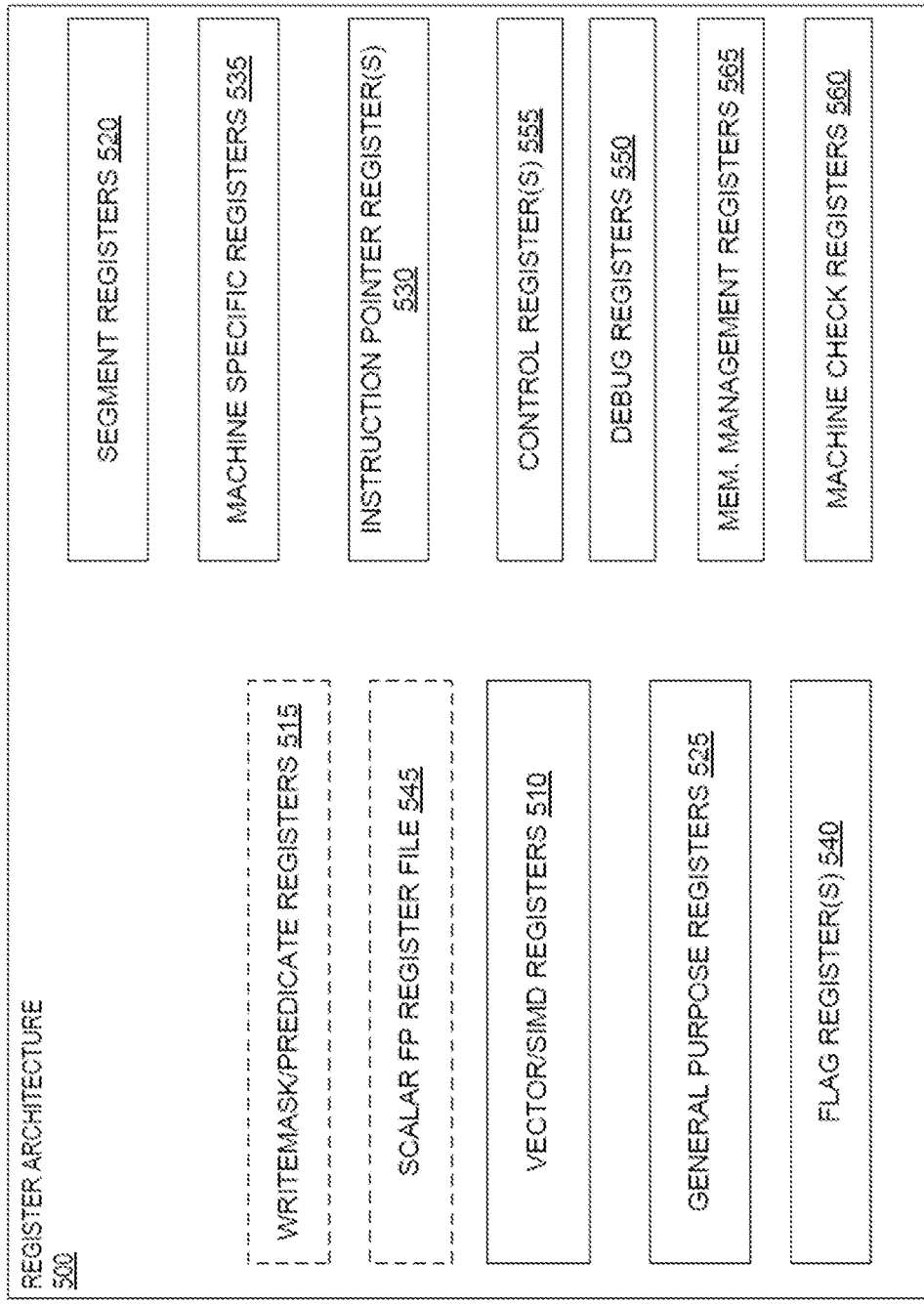
FIG. 5 illustrates one embodiment of a register architecture.

FIG. 5 is a block diagram of a register architecture 500 according to some embodiments. As illustrated, there are vector/SIMD registers 510 that vary from 128-bit to 1,024 bits width. In some embodiments, the vector/SIMD registers 510 are physically 512-bits and, depending upon the mapping, only some of the lower bits are used. For example, in some embodiments, the vector/SIMD registers 510 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 500 includes writemask/predicate registers 515. For example, in some embodiments, there are 8 writemask/predicate registers (sometimes called k0 through k7) that are each 16-bit, 32-bit, 64-bit, or 128-bit in size. Writemask/predicate registers 515 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 515 corresponds to a data element position of the destination. In other embodiments, the writemask/predicate registers 515 are scalable and consists of a set number of enable bits for a given vector element (e.g., 8 enable bits per 64-bit vector element).

The register architecture 500 includes a plurality of general-purpose registers 525. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 500 includes scalar floating-point register 545 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 540 (e.g., EFLAGS, RFLAGS, etc.) store status and control information for arithmetic, compare, and system operations. For example, the one or more flag registers 540 may store condition code information such as carry, parity, auxiliary carry, zero, sign, and overflow. In some embodiments, the one or more flag registers 540 are called program status and control registers.

Segment registers 520 contain segment points for use in accessing memory. In some embodiments, these registers are referenced by the names CS, DS, SS, ES, FS, and GS.

Machine specific registers (MSRs) 535 control and report on processor performance. Most MSRs 535 handle system-related functions and are not accessible to an application program. Machine check registers 560 consist of control, status, and error reporting MSRs that are used to detect and report on hardware errors.

One or more instruction pointer register(s) 530 store an instruction pointer value. Control register(s) 555 (e.g., CR0-CR4) determine the operating mode of a processor (e.g., processor 170, 180, 138, 115, and/or 200) and the characteristics of a currently executing task. Debug registers 550 control and allow for the monitoring of a processor or core's debugging operations.

Memory management registers 565 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 6:
FIG. 6 illustrates one example of an instruction format.

FIG. 6 illustrates embodiments of an instruction format. As illustrated, an instruction may include multiple components including, but not limited to, one or more fields for: one or more prefixes 601, an opcode 603, addressing information 605 (e.g., register identifiers, memory addressing information, etc.), a displacement value 607, and/or an immediate 609. Note that some instructions utilize some or all of the fields of the format whereas others may only use the field for the opcode 603. In some embodiments, the order illustrated is the order in which these fields are to be encoded, however, it should be appreciated that in other embodiments these fields may be encoded in a different order, combined, etc.

The prefix(es) field(s) 601, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 603 is used to at least partially define the operation to be performed upon a decoding of the instruction. In some embodiments, a primary opcode encoded in the opcode field 603 is 1, 2, or 3 bytes in length. In other embodiments, a primary opcode can be a different length. An additional 3-bit opcode field is sometimes encoded in another field.

Figure 7:
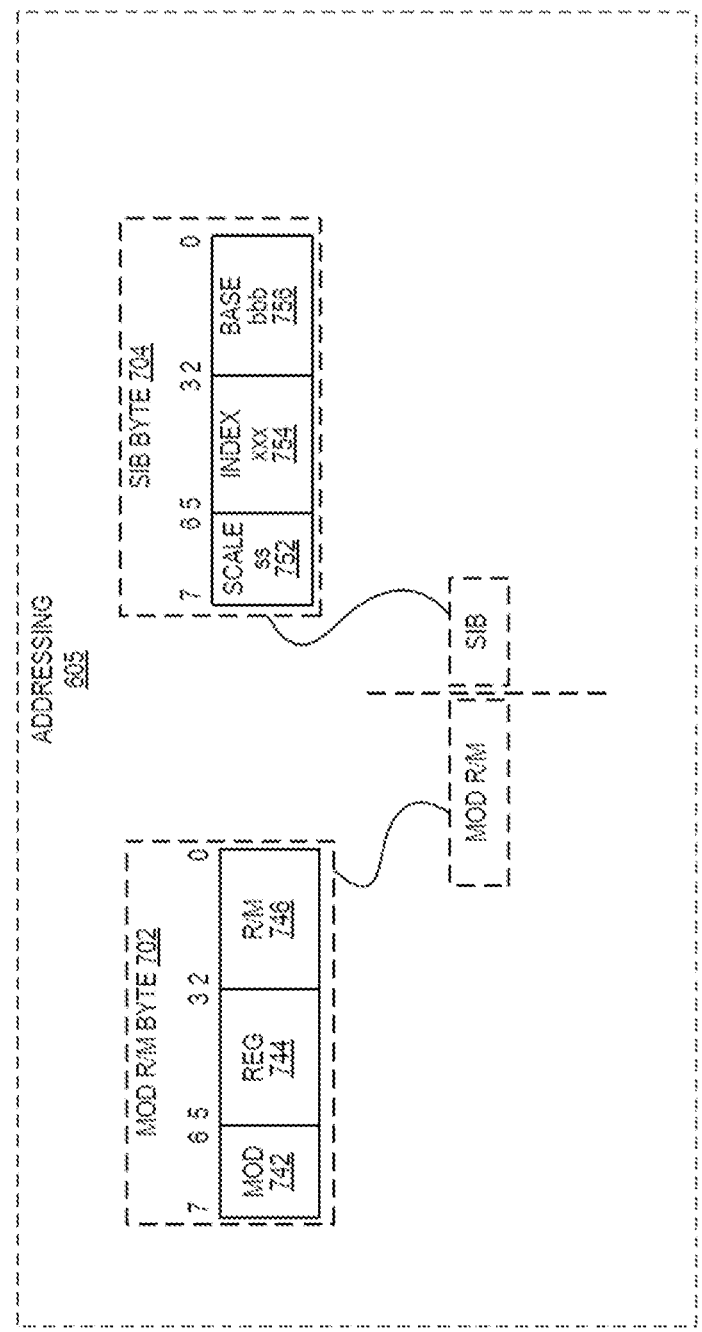
FIG. 7 illustrates addressing techniques in accordance with one embodiment.

The addressing field 605 is used to address one or more operands of the instruction, such as a location in memory or one or more registers. FIG. 7 illustrates embodiments of the addressing field 605. In this illustration, an optional ModR/M byte 702 and an optional Scale, Index, Base (SIB) byte 704 are shown. The ModR/M byte 702 and the SIB byte 704 are used to encode up to two operands of an instruction, each of which is a direct register or effective memory address. Note that each of these fields are optional in that not all instructions include one or more of these fields. The MOD R/M byte 702 includes a MOD field 742, a register field 744, and R/M field 746.

The content of the MOD field 742 distinguishes between memory access and non-memory access modes. In some embodiments, when the MOD field 742 has a value of b11, a register-direct addressing mode is utilized, and otherwise register-indirect addressing is used.

The register field 744 may encode either the destination register operand or a source register operand, or may encode an opcode extension and not be used to encode any instruction operand. The content of register index field 744, directly or through address generation, specifies the locations of a source or destination operand (either in a register or in memory). In some embodiments, the register field 744 is supplemented with an additional bit from a prefix (e.g., prefix 601) to allow for greater addressing.

The R/M field 746 may be used to encode an instruction operand that references a memory address, or may be used to encode either the destination register operand or a source register operand. Note the R/M field 746 may be combined with the MOD field 742 to dictate an addressing mode in some embodiments.

The SIB byte 704 includes a scale field 752, an index field 754, and a base field 756 to be used in the generation of an address. The scale field 752 indicates scaling factor. The index field 754 specifies an index register to use. In some embodiments, the index field 754 is supplemented with an additional bit from a prefix (e.g., prefix 601) to allow for greater addressing. The base field 756 specifies a base register to use. In some embodiments, the base field 756 is supplemented with an additional bit from a prefix (e.g., prefix 601) to allow for greater addressing. In practice, the content of the scale field 752 allows for the scaling of the content of the index field 754 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 607 provides this value. Additionally, in some embodiments, a displacement factor usage is encoded in the MOD field of the addressing field 605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 607.

In some embodiments, an immediate field 609 specifies an immediate for the instruction. An immediate may be encoded as a 1-byte value, a 2-byte value, a 4-byte value, etc.

FIG. 8 illustrates embodiments of a first prefix 601(A). In some embodiments, the first prefix 601(A) is an embodiment of a REX prefix. Instructions that use this prefix may specify up to three registers using 3-bit fields depending on the format: 1) using the reg field 744 and the R/M field 746 of the Mod R/M byte 702; 2) using the Mod R/M byte 702 with the SIB byte 704 including using the reg field 744 and the base field 756 and index field 754; or 3) using the register field of an opcode.

In the first prefix 601(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 744 and MOD R/M R/M field 746 alone can each only address 8 registers.

In the first prefix 601(A), bit position 2 (R) may an extension of the MOD R/M reg field 744 and may be used to modify the ModR/M reg field 744 when that field encodes a general purpose register, a 64-bit packed data register (e.g., a SSE register), or a control or debug register. R is ignored when Mod R/M byte 702 specifies other registers or defines an extended opcode.

Bit position 1 (X) X bit may modify the SIB byte index field 754.

Bit position B (B) B may modify the base in the Mod R/M R/M field 746 or the SIB byte base field 756; or it may modify the opcode register field used for accessing general purpose registers (e.g., general purpose registers 525).

FIGS. 9(A)-(D) illustrate embodiments of how the R, X, and B fields of the first prefix 601(A) are used. FIG. 9(A) illustrates R and B from the first prefix 601(A) being used to extend the reg field 744 and R/M field 746 of the MOD R/M byte 702 when the SIB byte 704 is not used for memory addressing. FIG. 9(B) illustrates R and B from the first prefix 601(A) being used to extend the reg field 744 and R/M field 746 of the MOD R/M byte 702 when the SIB byte 704 is not used (register-register addressing). FIG. 9(C) illustrates R, X, and B from the first prefix 601(A) being used to extend the reg field 744 of the MOD R/M byte 702 and the index field 754 and base field 756 when the SIB byte 704 being used for memory addressing. FIG. 9(D) illustrates B from the first prefix 601(A) being used to extend the reg field 744 of the MOD R/M byte 702 when a register is encoded in the opcode 603.

Figure 10A:
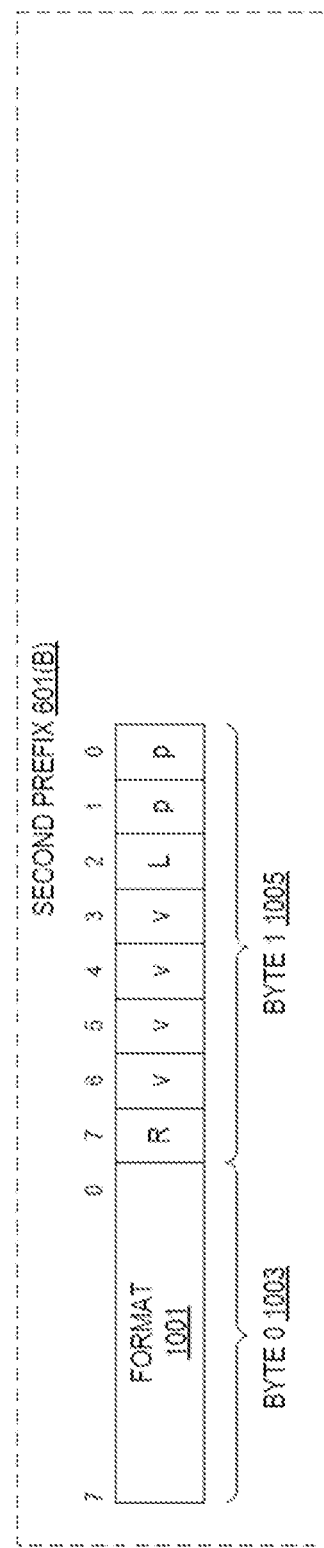
FIGS. 10A-B illustrate examples of a second instruction prefix.
Figure 10B:
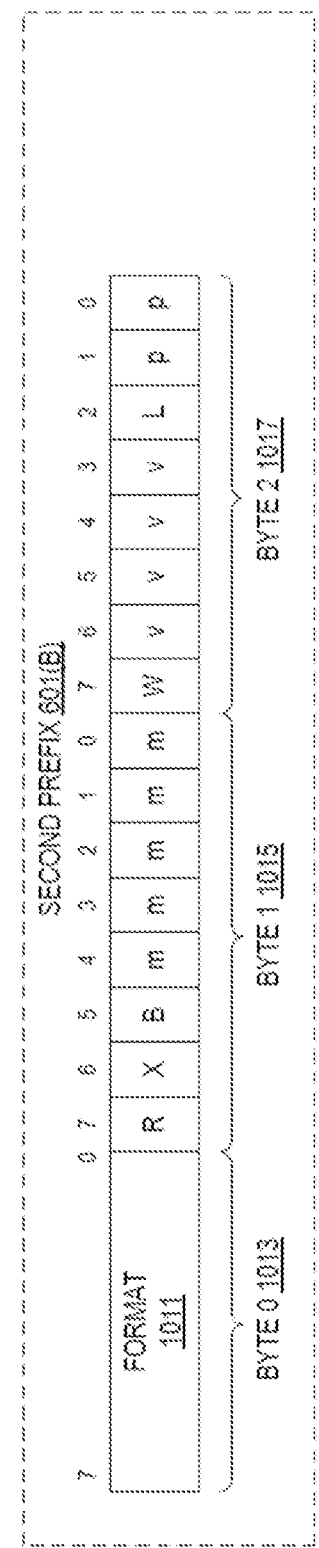

FIGS. 10(A)-(B) illustrate embodiments of a second prefix 601(B). In some embodiments, the second prefix 601(B) is an embodiment of a VEX prefix. The second prefix 601(B) encoding allows instructions to have more than two operands, and allows SIMD vector registers (e.g., vector/SIMD registers 510) to be longer than 64-bits (e.g., 128-bit and 256-bit). The use of the second prefix 601(B) provides for three-operand (or more) syntax. For example, previous two-operand instructions performed operations such as A=A+B, which overwrites a source operand. The use of the second prefix 601(B) enables operands to perform nondestructive operations such as A=B+C.

In some embodiments, the second prefix 601(B) comes in two forms—a two-byte form and a three-byte form. The two-byte second prefix 601(B) is used mainly for 128-bit, scalar, and some 256-bit instructions; while the three-byte second prefix 601(B) provides a compact replacement of the first prefix 601(A) and 3-byte opcode instructions.

FIG. 10(A) illustrates embodiments of a two-byte form of the second prefix 601(B). In one example, a format field 1001 (byte 0 1003) contains the value C5H. In one example, byte 1 1005 includes a "R" value in bit[7]. This value is the complement of the same value of the first prefix 601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746 and the Mod R/M reg field 744 encode three of the four operands. Bits[7:4] of the immediate 609 are then used to encode the third source register operand.

FIG. 10(B) illustrates embodiments of a three-byte form of the second prefix 601(B). in one example, a format field 1011 (byte 0 1013) contains the value C4H. Byte 1 1015 includes in bits[7:5] "R," "X," and "B" which are the complements of the same values of the first prefix 601(A). Bits[4:0] of byte 1 1015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1017 is used similar to W of the first prefix 601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746, and the Mod R/M reg field 744 encode three of the four operands. Bits[7:4] of the immediate 609 are then used to encode the third source register operand.

Figure 11:
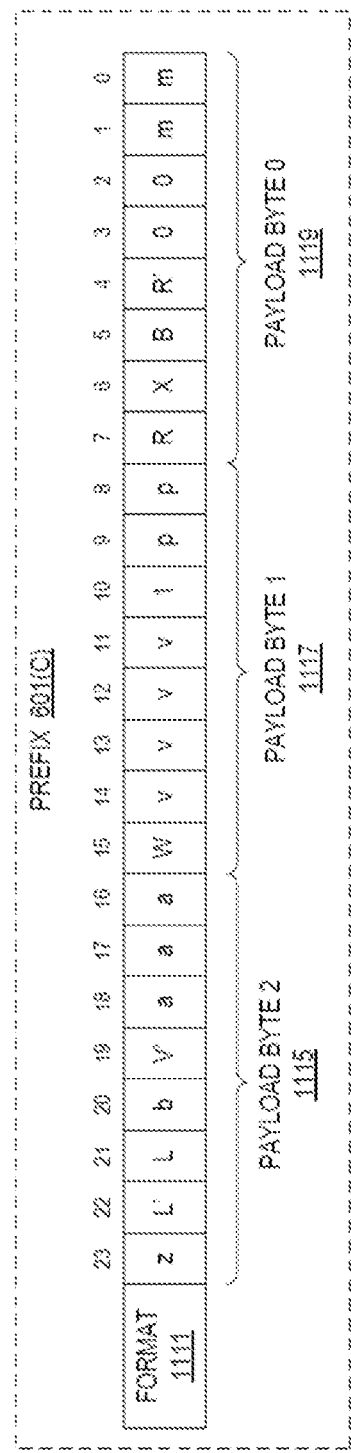
FIG. 11 illustrates payload bytes of one embodiment of an instruction prefix.

FIG. 11 illustrates embodiments of a third prefix 601(C). In some embodiments, the first prefix 601(A) is an embodiment of an EVEX prefix. The third prefix 601(C) is a four-byte prefix.

The third prefix 601(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 5) or predication utilize this prefix. Opmask register allow for conditional processing or selection control. Opmask instructions, whose source/destination operands are opmask registers and treat the content of an opmask register as a single value, are encoded using the second prefix 601(B).

The third prefix 601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 601(C) is a format field 1111 that has a value, in one example, of 62H. Subsequent bytes are referred to as payload bytes 1115-1119 and collectively form a 24-bit value of P[23:0] providing specific capability in the form of one or more fields (detailed herein).

In some embodiments, P[1:0] of payload byte 1119 are identical to the low two mmmmm bits. P[3:2] are reserved in some embodiments. Bit P[4] (R') allows access to the high 16 vector register set when combined with P[7] and the ModR/M reg field 744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 744 and ModR/M R/M field 746. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 601(A) and second prefix 611(B) and may serve as an opcode extension bit or operand size promotion.

P[18:16] specify the index of a register in the opmask (writemask) registers (e.g., writemask/predicate registers 515). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 601(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
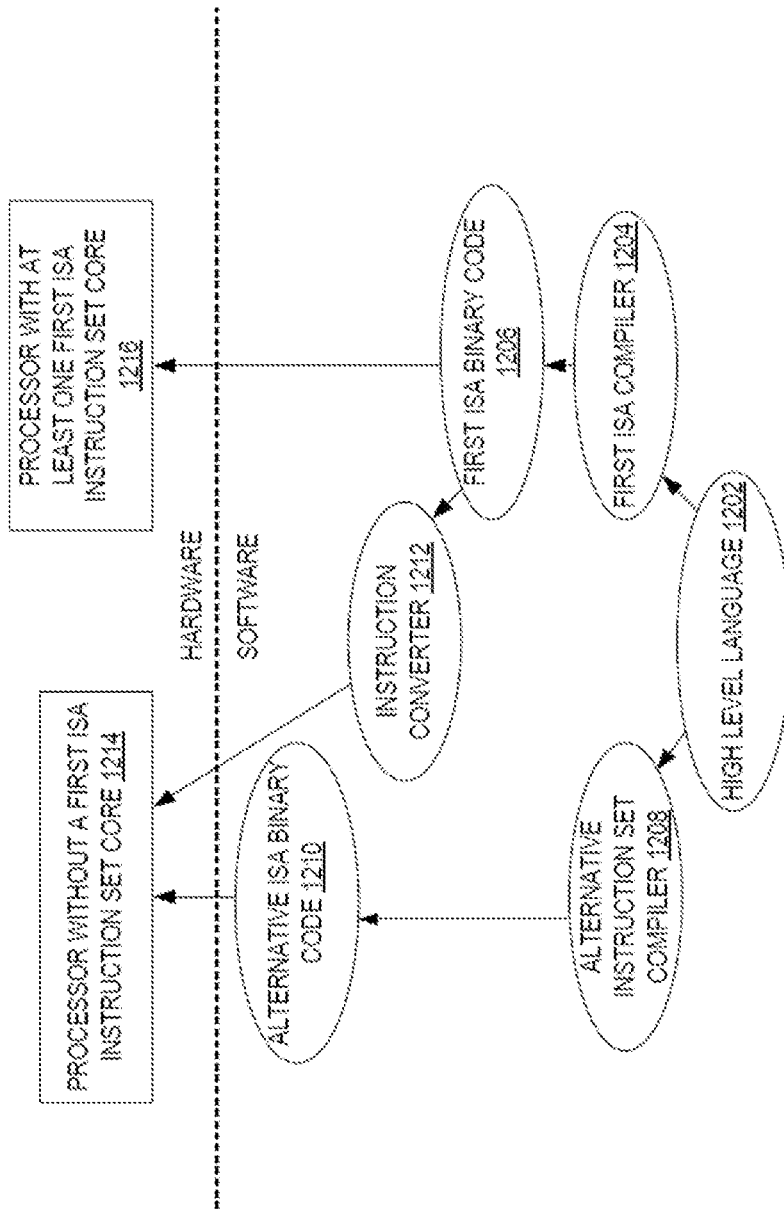
FIG. 12 illustrates instruction conversion and binary translation implementations.

FIG. 12 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using a first ISA compiler 1204 to generate first ISA binary code 1206 that may be natively executed by a processor with at least one first instruction set core 1216. The processor with at least one first ISA instruction set core 1216 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1204 represents a compiler that is operable to generate first ISA binary code 1206 (e.g., object code) that can, with or without additional linkage processing, be executed on the processor with at least one first ISA instruction set core 1216.

Similarly, FIG. 12 shows the program in the high level language 1202 may be compiled using an alternative instruction set compiler 1208 to generate alternative instruction set binary code 1210 that may be natively executed by a processor without a first ISA instruction set core 1214. The instruction converter 1212 is used to convert the first ISA binary code 1206 into code that may be natively executed by the processor without a first ISA instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have a first ISA instruction set processor or core to execute the first ISA binary code 1206.

Apparatus and Method for Secure Microcode (uCode) Patching

Both x86 processors and ARM-based processors utilize core-level and chip-level microcode. Various mechanisms may be used to load the processor microcode including: (a) an early processor reset patch where the processor automatically patches the cores from fuses and/or flash memory; (b) basic input-output system (BIOS) patching from system flash memory or system memory; and (c) operating system (OS)-based patch loading mechanisms from system memory.

Processor microcode is currently loaded on a per-core basis from the system firmware flash storage or memory using the above mechanisms. Server system-on-chips (SoCs) are growing in size and complexity and there is a need for regular patch updates to deploy critical security fixes and power/performance updates. However, data center servers must meet strict uptime requirements. For example, some servers are not expected to be reset for an entire year. Thus, it is not desirable to reflash the system firmware image and reboot the servers to deploy new microcode patches as this would violate current data center uptime service level agreements (SLAs).

In order to solve this, many architectures allow the OS to provide patch updates at runtime without rebooting the system. However, OS patch updates do not remain persistent across system reboots. There will be situations where a server needs to be rebooted—either to recover from a system crash, regular maintenance, or migration of an existing VM to a different physical system. While the OS can re-apply the patch after the boot, it remains exposed to security vulnerabilities or unstable behavior during the early stages of the CPU reset and BIOS boot process because the microcode patch in system firmware is out-of-sync with the OS-applied patch. Moreover, due to the growing number of cores in existing SoCs, the time to orchestrate an OS patch update is increasing. For example, with existing SoC IP blocks and sockets on a server node it can now take several seconds for an OS scheduler to coordinate and update the patch on all its cores.

One embodiment of the invention includes a package-level architectural interface for applying the patches, implemented as a new instruction. The OS initiates the patching on just one core per socket or processor package. The new instruction, PATCH_COMMIT, invokes the on-die security controller in the processor package which responsively pulls the patch from memory and applies the patch to all the cores and relevant IP blocks in the SoC. This hardware-based patching flow is significantly more efficient than software-orchestrated patch updates implemented on current systems.

In one embodiment, once the patch or patches are successfully applied, the security controller stores the patch in a persistent storage on the processor chip/package or in a secure off-die/off-package storage location. During the next reboot, the security controller can pull the patch from this persistent location and patch the cores and/or IP blocks at reset without requiring an OS update. The security controller also verifies that the associated data structures around the patch are configured properly for the processor to be able to retrieve the patches on reset. In addition, the security controller also orders the patches in the correct sequence in case of a system reset. This mechanism works with a multitude of non-volatile memory (NVM) interfaces including SPI-NOR (system peripheral interface-NOR), NVMe (NVM express) or even interfaces where the storage is in a remote cluster such as remote DMA (RDMA).

In one embodiment, the security controller encrypts, and integrity-protects the patches and stores them in a remote storage cluster, such that multiple servers and multiple other security controllers can retrieve the same patches.

Figure 13:
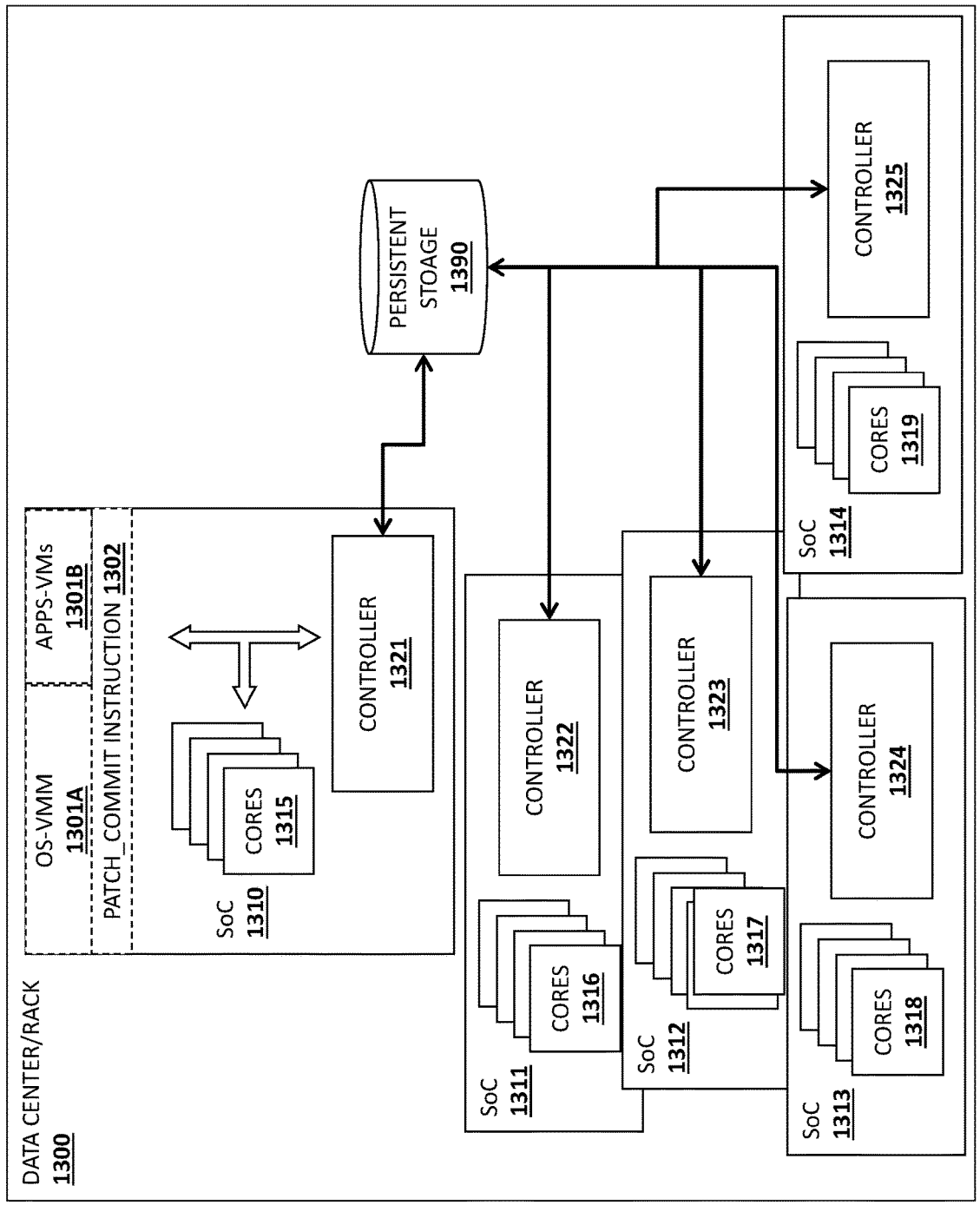
FIG. 13 illustrates a system comprising a plurality of system-on-chip devices and security controllers.

FIG. 13 illustrates a data center 1300 or individual rack within a data center on which embodiments of the invention may be implemented. The illustrated embodiment includes a plurality of system-on-chip devices 1310-1314 (sometimes simply referred to as "processors") each of which includes a plurality of cores 1315-1319 for executing program code 1301-1302 and processing data. The SoC devices 1310-1314 may be integrated within a single processor package and inserted in a socket of a larger computer system. Alternatively, each SoC device 1310-1314 may be included in a separate processor package.

In one embodiment, the cores 1315 are capable of executing program code at different privilege levels. For example, virtual machine monitors (VMMs) and/or operating systems (OSs) 1301A may run at a heightened or "supervisor" privilege level while virtual machines (VMs) and/or applications 1301B, are executed at relatively lower privilege levels. In one embodiment, the privilege levels include current privilege level (CPL) values ranging from 0 (most privilege) to 3 (least privilege); however, the underlying principles of the invention are not limited to systems which implement CPL privilege values.

In one embodiment, a PATCH_COMMIT instruction 1302 is included in the instruction set architecture (ISA) supported by the cores 1315 which allow execution of the instruction within specified privilege levels (e.g., a "supervisor" privilege level or CPL0). The PATCH_COMMIT instruction can be executed on any of the cores 1315 of a processor package (Socket) in a data center 1300. In one embodiment, the core executing the PATCH_COMMIT instruction 1302 uses a security controller 1321 to load and authenticate each uCode patch and apply the patch across all cores 1315 and IP blocks inside the SoC 1310. The authenticated uCode patch is then persisted onto a secure persistent storage device 1390 whereby it can be retrieved and applied at reset without depending on the OS, VMM or other software to supply the patch.

In one embodiment, the persistent storage 1390 may be integrated on the same die as one or more of the SoCs 1310-1314, or may be implemented on a separate unit on a separate die, either on the same package as the SoCs 1310-1314 or in an off-package storage location. The underlying principles of the invention are not limited to any particular configuration or location of the persistent storage 1390.

In one embodiment, each security controller 1321-1325 is a dedicated microcontroller executing firmware or other secure program code to perform security, storage, and other management functions on behalf of its respective SoC 1310-1314, respectively. Each security controller 1321-1325 is coupled to the persistent storage 1390 via a high speed interconnect or network to store and load the uCode patch updates as described herein. Once a new patch is stored, the security controller 1321 can pull the patch from the persistent storage location 1390 and patch the cores 1315 and/or IP blocks at reset without requiring OS/VMM interaction. In one embodiment, the security controller 1315 also verifies that the associated data structures around the patch are configured properly for the SoC 1310 to be able to retrieve the patches on reset. In addition, the security controller 1315 of one embodiment orders the patches in the correct sequence to be ready in case of a system reset.

Figure 14:
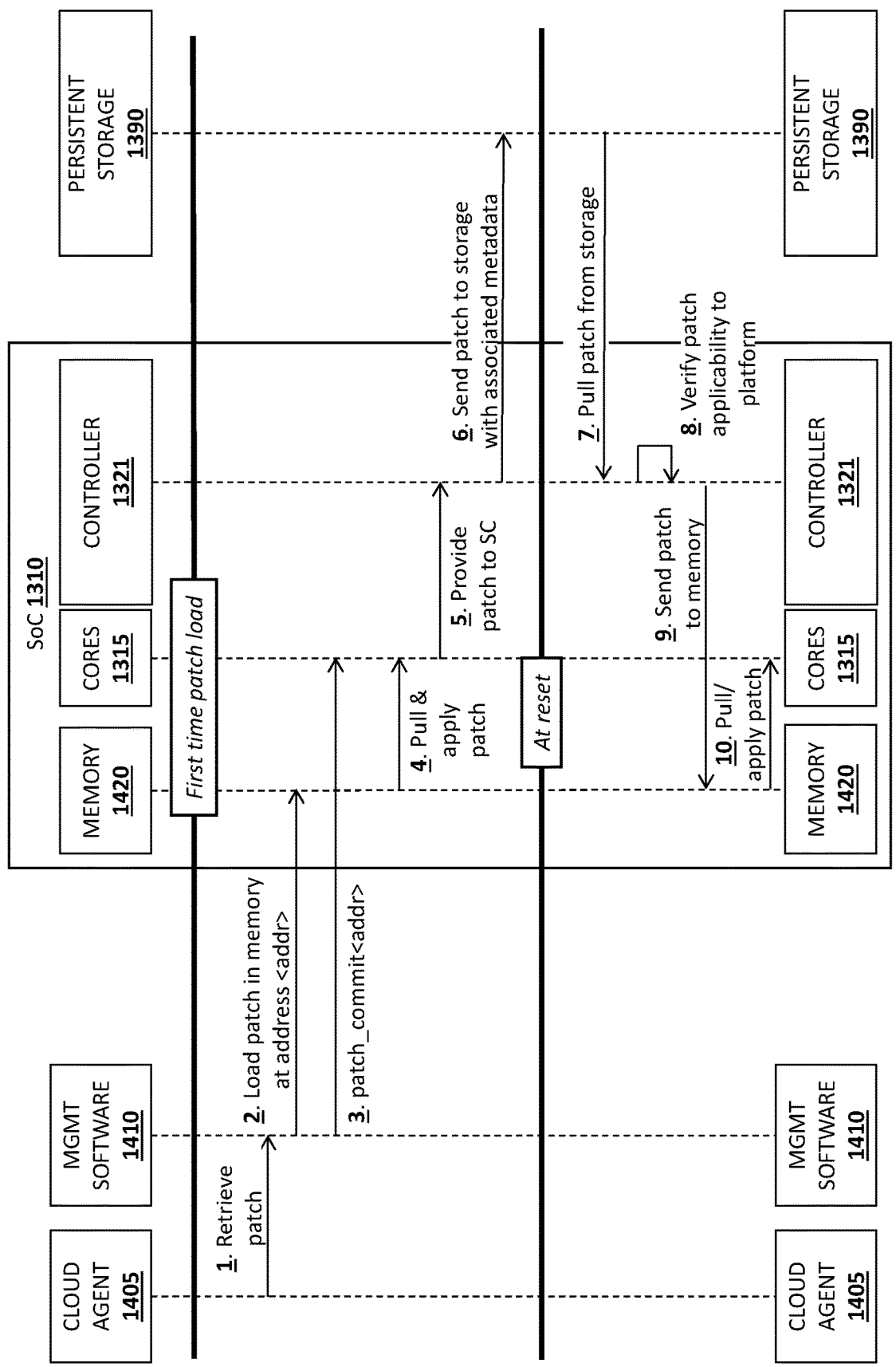
FIG. 14 illustrates a transaction diagram showing interactions between management software, SoCs, and persistent storage.

FIG. 14 illustrates one embodiment of a sequence of transactions for performing secure, efficient patch updates via interactions between management software 1410, a security controller 1321 and cores 1315 of an SoC 1310, and a secure, persistent storage device 1390 (e.g., a non-volatile memory device such as an NVMe device, a SPI-NOR device, etc). A first sequence of transactions 1-6 are performed the first time the uCode patch is loaded. A second set of transactions 7-10 are performed when applying the new uCode patch to other components (e.g., other cores 1316-1319 on other SoCs 1311-1314 within the same package or a different package).

In transaction 1, management software 1410 running on the SoC 1310 (or other data center processor) retrieves a new patch from a cloud agent 1405 (e.g., an external agent associated with the provider or the SoC 1310 or a third party). In transaction 2, the system management software 1410 loads the patch into a specified address of a memory 1420 in the SoC 1310 (e.g., an on-chip or on-package DRAM or other secure memory location). In transaction 3, one of the cores 1315 fetches, decodes, and executes the PATCH_COMMIT instruction, using the memory address specified by the management software 1410 as an operand. In response to the patch_commit instruction, in transaction 4, the patch is pulled from memory and applied. For example, the core 1315 may use the patch to update its own uCode and/or the uCode of one or more other IP blocks/cores within the SoC 1310 (e.g., other cores, graphics circuitry, a memory controller, an I/O controller, etc). In transaction 5, the security controller 1321 is provided the patch. For example, the core 1315 may send the security controller 1321 a secure message indicating the memory address or other storage location where the patch is stored. The security controller 1321 then sends the patch to the persistent storage device 1390, along with the associated metadata uniquely identifying the patch and providing details related to the patch (e.g., the system/processor components to which the patch applies, the patch version and release date, authentication/encryption values to access the patch, etc).

In one embodiment, transactions 7-10 are implemented to apply the patch to other cores 1316-1319 or IP blocks of the SoC 1310 and/or other SoCs 1311-1314 within the package or system. As indicated in FIG. 14, once the patch has been stored in the persistent storage 1390, any security controller 1321-1325 with access to the persistent storage 1390 can apply the patch to its cores and other IP components. By way of example, and not limitation, these transactions 7-10 may be applied in response to a reset of the system and/or the individual SoCs 1310-1314 within the system.

In Transaction 7, the security controller 1321 pulls the uCode patch from persistent storage 1390 and, in transaction 8, verifies the applicability of the patch. For example, the security controller 1321 may read the metadata associated with the patch to determine which components (if any) require uCode updates. In addition, it may verify the authenticity of the patch and/or metadata using various forms of authentication (e.g., using a key to generate a signature over the patch/metadata and verifying the signature, decrypting the patch/metadata, etc). Once it verifies the patch and the applicability of the patch, in transaction 9, the security controller 1321 stores the patch to a specified address in memory 1420. One or more of the cores 1315 may then execute the PATCH_COMMIT <addr> instruction using the specified address to apply the patch to cores and/or other IP blocks.

In one embodiment, the cores 1315 and/or security controller 1321 may perform one or more additional verification steps prior to applying the patch. These additional verification steps may include authenticating the patch using a key to verify a signature associated with the patch, decrypting the patch (if stored in an encrypted format), and performing one or more microarchitectural security checks.

In one embodiment, the uCode patch is distributed as a 2,048 (2 kilobyte) binary blob and a 48-Byte header including metadata indicating those processors or IP blocks for which the patch is designed. In one embodiment, the core 1315 executes a CPUID instruction and checks the results against the uCode metadata to ensure that the uCode should be applied. In one embodiment, the core 1315 executes a privileged uCode update program code including the PATCH_COMMIT instruction which is able to reconfigure and enable/disable processor components using a special register and update breakpoint match registers as required.

The embodiments of the invention described above may be implemented at the rack level or the data center level, where all the patches for the servers in the data center are in one storage area and all servers will have the same set of uCode patches at a given point in time. This not only lowers the cost of patch management in a data center, it also lowers the dependence on third party VMs and VMMs for patch management. This is also usable for environments where the CSP provides the hardware while the customer owns the rest of the stack. Because of these embodiments, a customer no longer needs to generate new system images for new patches.

Figure 15:
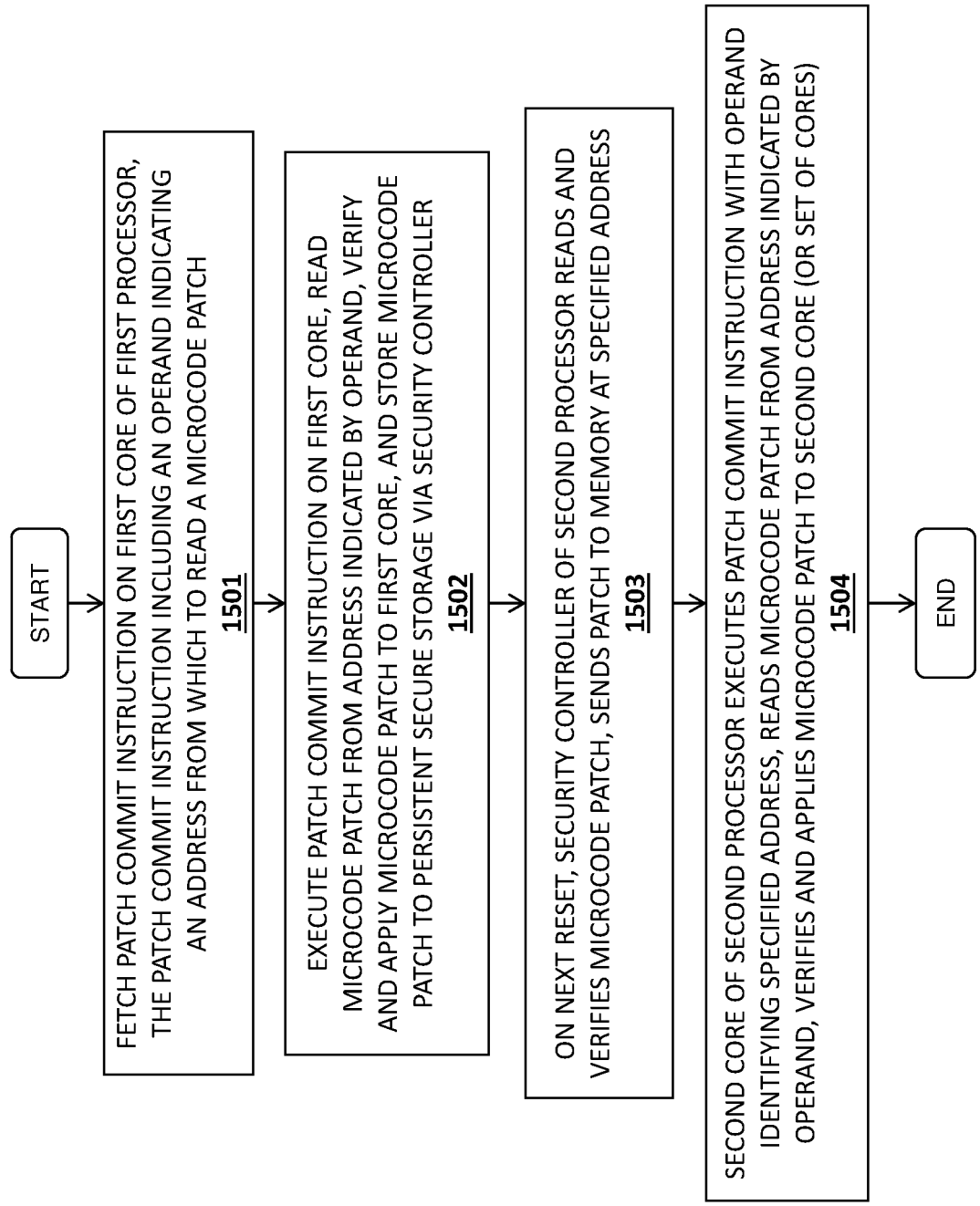
FIG. 15 illustrates a method in accordance with one embodiment of the invention.

A method in accordance with one embodiment is illustrated in FIG. 15. The method may be implemented within the context of the processor and system architectures described herein, but is not limited to any particular architecture.

At 1501, a patch commit instruction is fetched by a first core of a first processor. The patch commit instruction includes an operand indicating an address from which to read a microcode patch. At 1502, the first core executes the patch commit instruction and the first core (and/or the security controller) reads the microcode patch from the address indicated by the operand, verifies and applies the microcode patch to the first core (and/or other relevant IP blocks). In one embodiment, the first core also communicates with the security controller to store the patch to a persistent secure storage (e.g., on the same package as the other cores/SoCs).

At 1503, on the next reset, a security controller of a second processor reads and verifies the microcode patch and stores the patch to memory at a specified address. At 1504, a second core of the second processor (or set of cores) executes the patch commit instruction with an operand identifying the specified memory address. The second core reads the microcode patch from the address, verifies the microcode patch, and applies the microcode patch to the second core or set of cores of the second processor as well as any other relevant IP blocks.

Figure 16:
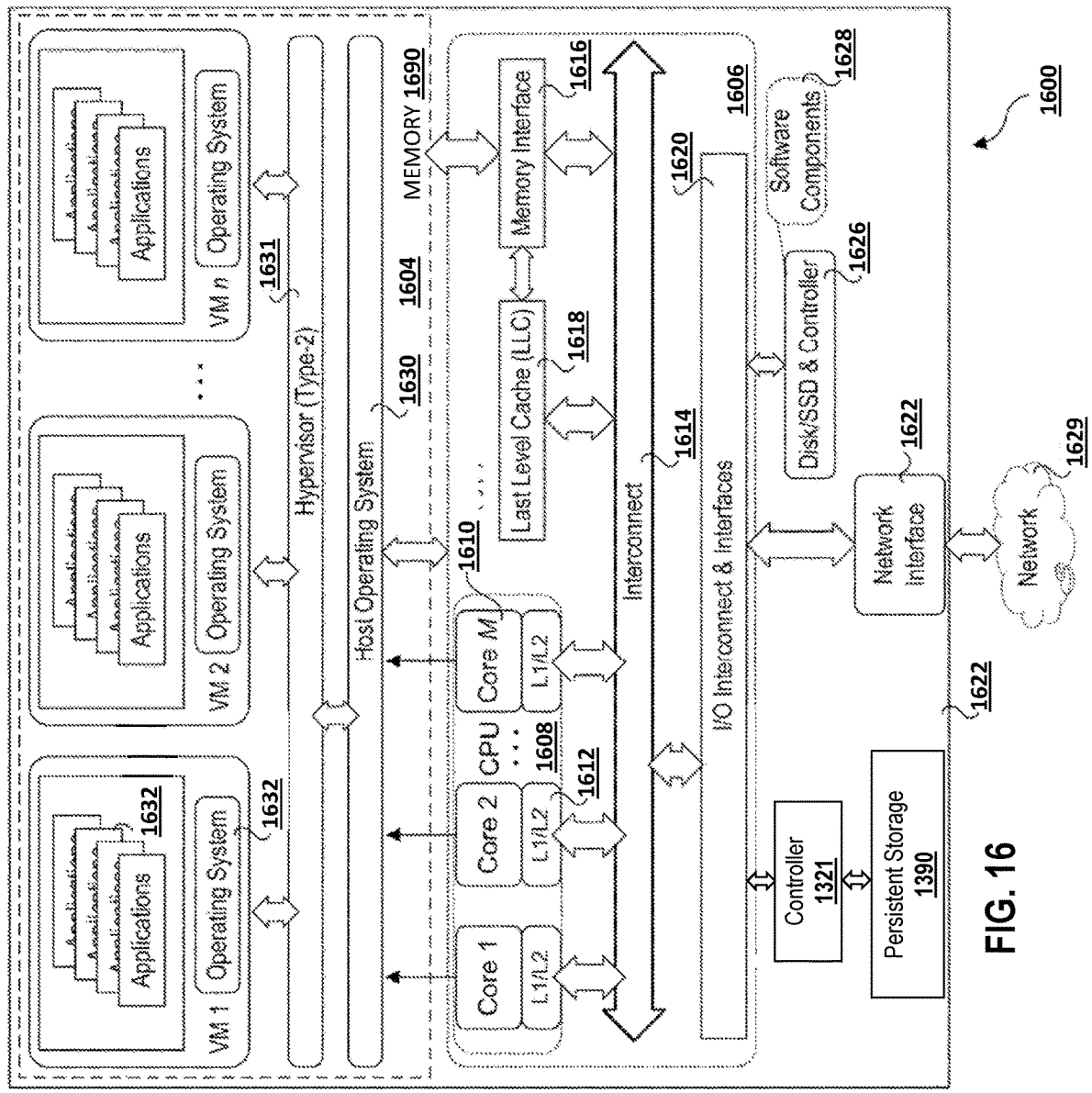
FIG. 16 illustrates one example of a system architecture.

FIG. 16 shows an embodiment of a platform architecture 1600 corresponding to a computing platform suitable for implementing embodiments of the invention described herein. Architecture 1600 includes a hardware layer in the lower portion of the diagram including platform hardware 1602, and a software layer that includes software components running in host memory 1604. Architecture 1600 implements the modular microcode (uCode) patch techniques described herein to support runtime persistent updates using a security controller 1321 and persistent storage 1390.

The software components include a host operating system 1630 and a Type-2 hypervisor 1631 used to host n virtual machines (VMs) VM 1, VM 2 . . . VM n, each including an operating system 432 on which one or more applications 434 are run. Platform architectures employing containers, such as Docker®-type containers, may be implemented in a similar manner. In addition, non-virtualized computing platforms that only run a single instance of an operating system may also be used.

Platform hardware 1602 includes a processor 1606 having a System on a Chip (SoC) architecture including a central processing unit (CPU) 1608 with M processor cores 1610, each coupled to a Level 1 and Level 2 (L1/L2) cache 1612. Each of the processor cores and L1/L2 caches are connected to an interconnect 1614 to which each of a memory interface 1616 and a Last Level Cache (LLC) 1618 is coupled, forming a coherent memory domain. Memory interface is used to access memory 1604 in which various software components are loaded and run via execution of associated software instructions on processor cores 1610, including the PATCH_COMMIT instruction.

In one embodiment, for example, a first one of the processor cores 1610 may execute the PATCH_COMMIT instruction, retrieve the uCode patch from a memory location specified in the instruction, apply the patch to its own microcode (and/or other relevant IP blocks) and store the uCode patch in persistent storage 1390 via the security controller 1321. On the next reset, other cores 1610 may execute the PATCH_COMMIT instruction to apply the patch to their uCode, in accordance with control signals provided by the security controller 1321.

Processor 1606 further includes an Input/Output (I/O) interconnect hierarchy, which includes one or more levels of interconnect circuitry and interfaces that are collectively depicted as I/O interconnect & interfaces 1620 for simplicity. Various components and peripheral devices are coupled to processor 1606 via respective interfaces (not all separately shown), including a network interface 1622, a BIOS flash device (not shown) operatively coupled to processor 1606 via a platform controller hub (PCH) (not shown). Platform hardware 1602 also includes a disk drive or solid state disk (SSD) with controller 1626 in which software components 1628 are stored. Optionally, all or a portion of the software components used to implement the software aspects of embodiments herein may be loaded over a network 1629 accessed by network interface 1622.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

EXAMPLES

The following are example implementations of different embodiments of the invention.

Example 1. An apparatus comprising: a package comprising one or more integrated circuit dies, the one or more integrated circuit dies comprising: a plurality of cores; and a security controller coupled to the plurality of cores, a first core of the plurality of cores comprising: a decoder to decode a microcode patching instruction, the microcode patching instruction comprising an operand to be used to identify an address; and execution circuitry to execute the microcode patching instruction, wherein responsive to the microcode patching instruction, the execution circuitry and/or security controller are to: retrieve a microcode patch from a location in memory based on the address, validate the microcode patch, apply the microcode patch to update or replace microcode associated with the one or more integrated circuit dies, and transmit the microcode patch to a persistent storage device; wherein the microcode patch is to be subsequently retrieved from the persistent storage device by one or more external security controllers of one or more external integrated circuit dies, the one or more external security controllers to cause the microcode patch to be applied to update or replace microcode associated with the one or more external integrated circuit dies.

Example 2. The apparatus of example 1 wherein validating the microcode patch comprises evaluating metadata associated with the microcode patch to determine applicability of the microcode patch to the plurality of cores and/or intellectual property (IP) blocks of the one or more integrated circuit dies.

Example 3. The apparatus of example 2 wherein validating the microcode patch comprises generating a signature over the microcode patch.

Example 4. The apparatus of example 1 wherein the one or more external security controllers are to validate the microcode patch prior to causing the microcode patch to be applied to update or replace microcode associated with the one or more external integrated circuit dies.

Example 5. The apparatus of example 1 wherein the persistent storage device comprises a non-volatile memory device integrated on the package, on a different package within the apparatus, or on a remote apparatus.

Example 6. The apparatus of example 5 wherein the persistent storage device comprises Serial Peripheral Interface (SPI)-NOR flash memory or Non-Volatile Memory Express (NVMe) flash memory.

Example 7. The apparatus of example 6 further comprising: a Remote Direct Memory Access (RDMA) interface to couple the apparatus to the non-volatile memory device on the remote apparatus.

Example 8. A method comprising: providing a package comprising one or more integrated circuit dies, the one or more integrated circuit dies comprising: a plurality of cores; and a security controller coupled to the plurality of cores, the method further comprising: decoding by a decoder a microcode patching instruction, the microcode patching instruction comprising an operand to be used to identify an address; and executing, by execution circuitry, the microcode patching instruction, wherein responsive to the microcode patching instruction, the execution circuitry and/or security controller are to perform the operations of: retrieving a microcode patch from a location in memory based on the address, validating the microcode patch, applying the microcode patch to update or replace microcode associated with the one or more integrated circuit dies, and transmitting the microcode patch to a persistent storage device; wherein the microcode patch is to be subsequently retrieved from the persistent storage device by one or more external security controllers of one or more external integrated circuit dies, the one or more external security controllers to cause the microcode patch to be applied to update or replace microcode associated with the one or more external integrated circuit dies.

Example 9. The method of example 8 wherein validating the microcode patch comprises evaluating metadata associated with the microcode patch to determine applicability of the microcode patch to the plurality of cores and/or intellectual property (IP) blocks of the one or more integrated circuit dies.

Example 10. The method of example 9 wherein validating the microcode patch comprises generating a signature over the microcode patch.

Example 11. The method of example 8 wherein the one or more external security controllers are to validate the microcode patch prior to causing the microcode patch to be applied to update or replace microcode associated with the one or more external integrated circuit dies.

Example 12. The method of example 8 wherein the persistent storage device comprises a non-volatile memory device integrated on the package, on a different package within the apparatus, or on a remote apparatus.

Example 13. The method of example 12 wherein the persistent storage device comprises Serial Peripheral Interface (SPI)-NOR flash memory or Non-Volatile Memory Express (NVMe) flash memory.

Example 14. The method of example 13 wherein the apparatus is coupled to the non-volatile memory device on the remote apparatus via a Remote Direct Memory Access (RDMA) interface.

Example 15. A system comprising: a first package comprising a first one or more integrated circuit dies, the first one or more integrated circuit dies comprising: a first plurality of cores; and a first security controller coupled to the plurality of cores, a first core of the first plurality of cores comprising: a first decoder to decode a microcode patching instruction, the microcode patching instruction comprising an operand to be used to identify a first address; and first execution circuitry to execute the microcode patching instruction, wherein responsive to the microcode patching instruction, the execution circuitry and/or security controller are to: retrieve a microcode patch from a memory based on the first address, validate the microcode patch, apply the microcode patch to update or replace microcode associated with the first one or more integrated circuit dies, and transmit the microcode patch to a persistent storage device; a second package on a different computing device than the first package, the second package comprising a second one or more integrated circuit dies, the second one or more integrated circuit dies comprising: a second plurality of cores; and a second security controller coupled to the second plurality of cores, the second security controller to read the microcode patch from the persistent storage device, verify the microcode patch, and store the microcode patch to the memory or a different memory at a second address, a second core of the second plurality of cores to read the microcode patch from the memory or the different memory based on the second address and to apply the microcode patch to update or replace microcode associated with the second one or more integrated circuit dies.

Example 16. The system of example 15 comprising wherein validating the microcode patch comprises evaluating metadata associated with the microcode patch to determine applicability of the microcode patch to the plurality of cores and/or intellectual property (IP) blocks of the one or more integrated circuit dies.

Example 17. The apparatus of example 16 wherein validating the microcode patch comprises generating a signature over the microcode patch.

Example 18. The apparatus of example 15 wherein the persistent storage device comprises a non-volatile memory device integrated on the first or second packages or on a remote apparatus.

Example 19. The apparatus of example 18 wherein the persistent storage device comprises Serial Peripheral Interface (SPI)-NOR flash memory or Non-Volatile Memory Express (NVMe) flash memory.

Example 20. The apparatus of example 19 further comprising: a Remote Direct Memory Access (RDMA) interface to couple the first package to the non-volatile memory device on the remote apparatus.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

We claim:

1. An apparatus comprising:
a package comprising one or more integrated circuit dies, the one or more integrated circuit dies comprising:
a plurality of cores; and
a security controller coupled to the plurality of cores, a first core of the plurality of cores comprising:
a decoder to decode a microcode patching instruction, the microcode patching instruction comprising an operand to be used to identify an address; and
execution circuitry to execute the microcode patching instruction, wherein responsive to the microcode patching instruction, the execution circuitry and/or security controller are to:
retrieve a microcode patch from a location in memory based on the address,
validate the microcode patch,
apply the microcode patch to update or replace microcode associated with the one or more integrated circuit dies, and
transmit the microcode patch to a persistent storage device;
wherein the microcode patch is to be subsequently retrieved from the persistent storage device by one or more external security controllers of one or more external integrated circuit dies, the one or more external security controllers to cause the microcode patch retrieved from the persistent storage device to be applied to update or replace microcode associated with the one or more external integrated circuit dies.

2. The apparatus of claim 1 wherein validating the microcode patch comprises evaluating metadata associated with the microcode patch to determine applicability of the microcode patch to the plurality of cores and/or intellectual property (IP) blocks of the one or more integrated circuit dies.

3. The apparatus of claim 2 wherein validating the microcode patch comprises generating a signature over the microcode patch.

4. The apparatus of claim 1 wherein the one or more external security controllers are to validate the microcode patch retrieved from the persistent storage device prior to causing the microcode patch retrieved from the persistent storage device to be applied to update or replace microcode associated with the one or more external integrated circuit dies.

5. The apparatus of claim 1 wherein the persistent storage device comprises a non-volatile memory device integrated on the package, on a different package within the apparatus, or on a remote apparatus.

6. The apparatus of claim 5 wherein the persistent storage device comprises Serial Peripheral Interface (SPI)-NOR flash memory or Non-Volatile Memory Express (NVMe) flash memory.

7. The apparatus of claim 6 further comprising:
a Remote Direct Memory Access (RDMA) interface to couple the apparatus to the non-volatile memory device on the remote apparatus.

8. A method comprising:
providing a package comprising one or more integrated circuit dies, the one or more integrated circuit dies comprising: a plurality of cores; and a security controller coupled to the plurality of cores, the method further comprising:
decoding by a decoder a microcode patching instruction, the microcode patching instruction comprising an operand to be used to identify an address; and
executing, by execution circuitry, the microcode patching instruction, wherein responsive to the microcode patching instruction, the execution circuitry and/or security controller are to perform the operations of:
retrieving a microcode patch from a location in memory based on the address,
validating the microcode patch,
applying the microcode patch to update or replace microcode associated with the one or more integrated circuit dies, and
transmitting the microcode patch to a persistent storage device;
wherein the microcode patch is to be subsequently retrieved from the persistent storage device by one or more external security controllers of one or more external integrated circuit dies, the one or more external security controllers to cause the microcode patch retrieved from the persistent storage device to be applied to update or replace microcode associated with the one or more external integrated circuit dies.

9. The method of claim 8 wherein validating the microcode patch comprises evaluating metadata associated with the microcode patch to determine applicability of the microcode patch to the plurality of cores and/or intellectual property (IP) blocks of the one or more integrated circuit dies.

10. The method of claim 9 wherein validating the microcode patch comprises generating a signature over the microcode patch.

11. The method of claim 8 wherein the one or more external security controllers are to validate the microcode patch retrieved from the persistent storage device prior to causing the microcode patch retrieved from the persistent storage device to be applied to update or replace microcode associated with the one or more external integrated circuit dies.

12. The method of claim 8 wherein the persistent storage device comprises a non-volatile memory device integrated on the package, on a different package within the apparatus, or on a remote apparatus.

13. The method of claim 12 wherein the persistent storage device comprises Serial Peripheral Interface (SPI)-NOR flash memory or Non-Volatile Memory Express (NVMe) flash memory.

14. The method of claim 13 wherein the apparatus is coupled to the non-volatile memory device on the remote apparatus via a Remote Direct Memory Access (RDMA) interface.

15. A system comprising:
a first package comprising a first one or more integrated circuit dies, the first one or more integrated circuit dies comprising:
a first plurality of cores; and
a first security controller coupled to the plurality of cores,
a first core of the first plurality of cores comprising:
a first decoder to decode a microcode patching instruction, the microcode patching instruction comprising an operand to be used to identify a first address; and
first execution circuitry to execute the microcode patching instruction, wherein responsive to the microcode patching instruction, the execution circuitry and/or security controller are to:
retrieve a microcode patch from a memory based on the first address, validate the microcode patch,
apply the microcode patch to update or replace microcode associated with the first one or more integrated circuit dies, and
transmit the microcode patch to a persistent storage device;
a second package on a different computing device than the first package, the second package comprising a second one or more integrated circuit dies, the second one or more integrated circuit dies comprising:
a second plurality of cores; and
a second security controller coupled to the second plurality of cores, the second security controller to read the microcode patch from the persistent storage device, verify the microcode patch read from the persistent storage device, and store the microcode patch read from the persistent storage device to the memory or a different memory at a second address,
a second core of the second plurality of cores to read the microcode patch from the memory or the different memory based on the second address and to apply the microcode patch to update or replace microcode associated with the second one or more integrated circuit dies.

16. The system of claim 15 comprising wherein validating the microcode patch comprises evaluating metadata associated with the microcode patch to determine applicability of the microcode patch to the plurality of cores and/or intellectual property (IP) blocks of the one or more integrated circuit dies.

17. The apparatus of claim 16 wherein validating the microcode patch comprises generating a signature over the microcode patch.

18. The apparatus of claim 15 wherein the persistent storage device comprises a non-volatile memory device integrated on the first or second packages or on a remote apparatus.

19. The apparatus of claim 18 wherein the persistent storage device comprises Serial Peripheral Interface (SPI)-NOR flash memory or Non-Volatile Memory Express (NVMe) flash memory.

20. The apparatus of claim 19 further comprising:
a Remote Direct Memory Access (RDMA) interface to couple the first package to the non-volatile memory device on the remote apparatus.

21. An apparatus comprising:
means for providing a package comprising one or more integrated circuit dies, the one or more integrated circuit dies comprising: a plurality of cores; and a security controller coupled to the plurality of cores, the method further comprising:
means for decoding by a decoder a microcode patching instruction, the microcode patching instruction comprising an operand to be used to identify an address; and
means for executing, by execution circuitry, the microcode patching instruction, wherein responsive to the microcode patching instruction, the execution circuitry and/or security controller are to perform the operations of:
retrieving a microcode patch from a location in memory based on the address, validating the microcode patch,
applying the microcode patch to update or replace microcode associated with the one or more integrated circuit dies, and
transmitting the microcode patch to a persistent storage device;
wherein the microcode patch is to be subsequently retrieved from the persistent storage device by one or more external security controllers of one or more external integrated circuit dies, the one or more external security controllers to cause the microcode patch retrieved from the persistent storage device to be applied to update or replace microcode associated with the one or more external integrated circuit dies.

22. The apparatus of claim 21 wherein validating the microcode patch comprises evaluating metadata associated with the microcode patch to determine applicability of the microcode patch to the plurality of cores and/or intellectual property (IP) blocks of the one or more integrated circuit dies.

23. The apparatus of claim 22 wherein validating the microcode patch comprises generating a signature over the microcode patch.

24. The apparatus of claim 21 wherein the one or more external security controllers are to validate the microcode patch retrieved from the persistent storage device prior to causing the microcode patch retrieved from the persistent storage device to be applied to update or replace microcode associated with the one or more external integrated circuit dies.

25. The apparatus of claim 21 wherein the persistent storage device comprises a non-volatile memory device integrated on the package, on a different package within the apparatus, or on a remote apparatus.

26. The apparatus of claim 25 wherein the persistent storage device comprises Serial Peripheral Interface (SPI)-NOR flash memory or Non-Volatile Memory Express (NVMe) flash memory.

27. The apparatus of claim 26 wherein the apparatus is coupled to the non-volatile memory device on the remote apparatus via a Remote Direct Memory Access (RDMA) interface.

* * * * *